United States Patent

[11] 3,609,557

[72] Inventor James E. Goell
Middletown, N.J.
[21] Appl. No. 882,899
[22] Filed Dec. 8, 1969
[45] Patented Sept. 28, 1971
[73] Assignee Bell Telephone Laboratories, Incorporated
Murray Hill, Berkeley Heights, N.J.

[54] APPARATUS AND METHOD FOR BASEBAND DETECTION AND EQUALIZATION OF INFORMATION SIGNALS
14 Claims, 1 Drawing Fig.

[52] U.S. Cl. .......... 325/473, 178/66, 325/320, 325/444
[51] Int. Cl. .......... H04b 1/16
[50] Field of Search .......... 178/66, 88; 325/320, 419, 344, 444, 473, 30, 42; 328/134; 329/104, 122, 123, 124; 333/29

[56] References Cited

UNITED STATES PATENTS 3,252,093 5/1966 Lerner .......... 325/42
3,470,478 9/1969 Crafts .......... 325/320

*Primary Examiner*—Benedict V. Safourek
*Assistant Examiner*—Anthony H. Handal
*Attorneys*—R. J. Guenther and Arthur J. Torsiglieri

ABSTRACT: Baseband detection and equalization of a signal having arbitrary modulation and distortion is achieved by linearly down-converting the signal to baseband be means of a pair of homodynes driven by a synchronous local oscillator. Each of the homodyne outputs (i.e., the in-phase and out-of-phase components) is equalized by a baseband transversal equalizer comprising a pair of delay lines having a tap separation not greater than 1/Δf, where Δf is the bandwidth over which equalization is desired. The taps of each delay line are coupled through attenuators to a summing network, the output of which is the in-phase (or out-of-phase) component equalized depending on whether the attenuation levels correspond to ($\alpha_n$,$-\beta_n$) or ($\beta_n$,$\alpha_n$), respectively, where $\alpha_n$ and $\beta_n$ are, in a frequency-domain analysis, the coefficients of the Fourier series of the Fourier transform of the system component or apparatus producing the distortion. Alternatively, $\alpha_n$ and $\beta_n$ can be determined from a time-domain analysis in which $\alpha_n$ and $\beta_n$ are chosen such that the signal is set to zero at a sufficient number of sampling instants to allow satisfactory transmission.

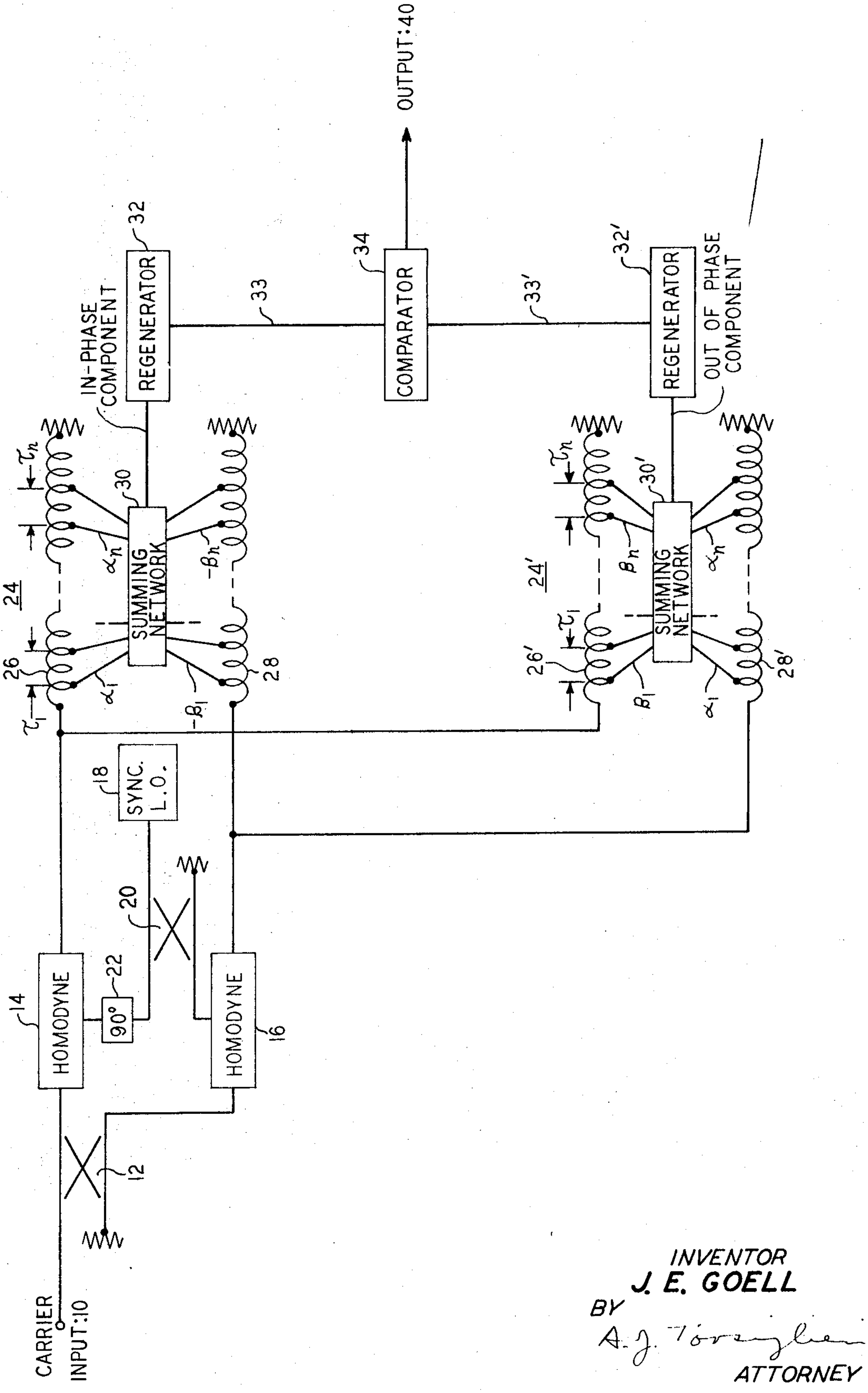
INVENTOR
J. E. GOELL
BY
A. J. Torsiglieri
ATTORNEY

APPARATUS AND METHOD FOR BASEBAND DETECTION AND EQUALIZATION OF INFORMATION SIGNALS

BACKGROUND OF THE INVENTION

This invention relates to apparatus and methods for the baseband detection and equalization of signals having arbitrary modulation and distortion.

One of the essential functions which must be performed in any communication system, whether it involves amplitude, frequency or phase modulation or a combination thereof, is to reconstruct a transmitted signal, often a pulse in PCM systems for example, after it has traveled through a dispersive, noisy medium. The process of regenerating a signal at intervals along a transmission path is performed by regenerative repeaters which perform three basic functions: reshaping, timing, and regeneration. The first of these functions, reshaping, is generally accomplished in part by an equalizer within the repeater and may be performed at either carrier frequencies or at baseband. In the former case the components, especially the phase shifters required, can be difficult and expensive to fabricate. One technique for eliminating the need for such phase shifters in a carrier transversal equalizer is disclosed in my copending application, J. E. Goell Case 5, U.S. Ser. No. 868,034 filed on Oct. 21, 1969 and assigned to the assignee hereof. Nonetheless, there are systems in which, for design, economic or other considerations, it is desirable to equalize at baseband even though this method necessitates down-conversion of the signal from RF to baseband with attendant detection and carrier recovery apparatus. For example, in conventional amplitude-modulated PCM systems it is common to equalize phase distortion at baseband. Since such transmission systems are linear in amplitude, the carrier removal process must also be linear in amplitude.

To satisfy this requirement it is common in the prior art detectors to remove the carrier from the signal to produce either its in-phase or out-of-phase component of the original signal, but not both. The signal component may then be equalized by means of tapped delay line transversal equalizer. This approach is satisfactory, however, only if the original signal contains no information content represented by phase modulation. Thus, such a single homodyne detector would be inappropriate in a frequency-modulated binary differentially coherent phase shift-keyed system of the type disclosed in U.S. Pat. application Ser. No. 568,893 of W. D. Warters filed on July 29, 1966 and assigned to applicant's assignee. Consequently, prior art systems are limited in the types of modulated information which can be detected and equalized.

It is, therefore, a broad object of this invention to detect and equalize signals of arbitrary modulation and distortion.

It is another object of this invention to perform this detection linearly in amplitude.

It is still another object of this invention to detect and equalize signals containing phase-modulated information.

It is yet another object of this invention to equalize a distorted signal by decomposing the signal into its in-phase and out-of-phase components each of which is separately equalized.

SUMMARY OF THE INVENTION

These and other objects of the invention are accomplished in an illustrative embodiment of the invention in which baseband detection and equalization of a signal having arbitrary modulation and distortion is achieved by linearly down-converting the signal to baseband by means n, a pair homodynes driven by a synchronous local oscillator. Each of the homodyne outputs (i.e., the in-phase and out-of-phase components) is equalized by a baseband transversal equalizer comprising a pair of plurally tapped delay lines having uniform tap separations not greater than $1/\Delta f$, where $\Delta f$ is the bandwidth over which equalization is desired. The taps of each delay line are coupled through attenuators to a summing network, the output of which is the in-phase (or out-of-phase) component equalized depending on whether the attenuation levels correspond to $(\alpha_n, -\beta_n)$ or $(\beta_n, \alpha_n)$, respectively, where $\alpha_n$ and $\beta_n$ are, in a frequency-domain analysis, the coefficients of the Fourier series of the Fourier transform of the system component or apparatus producing the distortion. Alternatively, $\alpha_n$ and $\beta_n$ can be determined from a time-domain analysis in which $\alpha_n$ and $\beta_n$ are chosen such that the signal is set to zero at a sufficient number of sampling instants to allow satisfactory transmission (e.g., at each sampling instant).

BRIEF DESCRIPTION OF THE DRAWING

These and other objects of the invention, together with its various features and advantages, can be easily understood from the following more detailed discussion taken in conjunction with the accompanying drawing in which the sole FIGURE is a schematic of an illustrative embodiment of the invention.

DETAILED DESCRIPTION

A generalized undistorted signal $S(t)$ with arbitrary modulation can be expressed in the time domain as follows:

$$S(t)=A(t)\sin[\omega_0 t+\Phi(t)] \qquad (1)$$

where $A(t)$ and $(t)$ represent amplitude and phase modulation, respectively, and $\omega_0$ is the angular carrier frequency. The effect of a distortion on equation (1) would be to introduce certain convolution functions and would unnecessarily complicate the expression. Since the principles of the present invention can readily be understood without such complication, the equation for $S(t)$ including such distortion will not be utilized herein.

The generalized signal $S(t)$ can, by well-known trigonometric identity, be decomposed into its conjugate components: an undistorted in-phase component $S_i(t)$ given by $$S_i(t)=[A(t)\cos\ (t)]\sin\omega\sin\mathbf{107}\ _0 t \qquad (2)$$

and an undistorted out-of-phase component $S_q(t)$ given by $$S_q(t)=[A(t)\sin\Phi(t)]\cos\omega_0 t. \qquad (3)$$

In the present invention, however, it should be noted that it is distorted versions of $S_i(t)$ and $S_q(t)$ which are actually equalized and the distorted versions of $S(t)$ which are actually detected.

It will be simpler, therefore, to discuss the invention with reference to signals in the frequency domain, rather than in the time domain.

More referring to the figure, a distorted carrier input signal 10 can be represented in the frequency domain by the following expression:

$$D(\omega)=D_i(\omega)+D_q(\omega)e^{j\pi/2}, \qquad (4)$$

where $D_i(\omega)$ and $D_q(\omega)$ are the distorted in-phase and out-of-phase components of $D(\omega)$ and $e_{j\pi/2}$ represents 90° of phase quadrature. The signal $D(\omega)$ is divided into essentially equal components by a hybrid coupler 12 and applied to the inputs of a pair of well-known homodynes 14 and 16. It should be noted that the outputs of a hybrid coupler in phase quadrature, hence the inputs to homodynes 14 and 16 are in phase quadrature. The homodynes are driven by a synchronous local oscillator 18, i.e., an oscillator which is phase locked to the carrier of the input signal 10. Such a local oscillator signal can be derived by means of well-known carrier recovery circuits or, in the case of an FM–BDCPSK input signal, by means of a circuit as described in my copending application, J. E. Goell Case 8, U.S. Ser. No. 879,994 filed Nov. 26, 1969 and assigned to the assignee hereof. Alternatively, for any order DPM system another copending application of mine, J. E Goell Case 7, U.S. qNo. 879,992 filed Nov. 26, 1969, and assigned to the assignee hereof, describes a technique for eliminating the need for a synchronous local oscillator in the detector. The local oscillator is divided by hybrid 20 into two signals, one of which is applied directly to the input of homodyne 16 and the other of which is passed through 90° phase shifter 22 to the input of homodyne 14 in order to remove the phase quadrature introduced by hybrid 20. Each homodyne linearly down-converts the distorted carrier input signal 10 to baseband, the output of homodyne 14 being the distorted inOphase baseband component $D_i(\omega)$ while the output of homodyne 16 is the distorted out-of-phase baseband component $D_q(\omega)$.

Both of these conjugate components are then applied to the input of each of a pair of baseband transversal equalizers 24 and 24'. Each of the equalizers comprise pair of resistively terminated plurally tapped delay lines 26—28 n28' having uniform tap separation $\tau$ such that $\tau \leq \frac{1}{\Delta f}$ where $\Delta f$ is the bandwidth over which equalization is desired. The parameter $\Delta f$ is typically determined by the nature of the input signal and other design criteria. Each tap is connected to a summing network 30—30' through separate attenuators ($\alpha_n$, $\beta_n$) which might typically include well-known dividing networks including amplifiers to provide isolation. The attenuation levels, or the magnitudes of $\alpha_n$ and $\beta_n$, are determined by the nature of the apparatus or system component producing the unwanted distortion. For example, a waveguide produces primarily quadratic phase distortion. More particularly, therefore, in a frequency domain analysis $\alpha_n$ and $\beta_n$ are the coefficients of the Fourier series of the Fourier transform of the transfer function of such apparatus or component.

It is to be especially noted, however, in iwith the present invention, that to equalize the in-phase distorted signal component analysis $D_i(\omega)$ from homodyne 14, that component is applied to the input of delay line 26 with each tap of that line coupled to summing network 30 through a separate attenuator having its attenuation level set at $+\alpha_n$, i.e., tap 1 is set at $\alpha_1$, tap 2 at $\alpha_2$ and tap $n$ at $\alpha_n$. Simultaneously, the out-of-phase distorted baseband signal component $D_q(\omega)$ from homodyne 16 is applied to the input of delay line 28 with its taps being connected to network 30 but with the signal portions in the $n$th path being attenuated by an amount $-\beta_n$. The resulting output $E_i(\omega)$ of network 30 is the in-phase signal component equalized, i.e., with the distortion removed, and can be expressed as $$E_i(\omega) = \sum_{n=1}^{N} \alpha_n D_i(\omega) e^{jn\omega\tau} - \sum_{n=1}^{N} \beta_n D_q(\omega) e^{jn\omega\tau} \qquad (5)$$

where $N$ is the number of taps in each delay line. This function is the same as that which would be obtained if the distorted signal were transmitted through a device with transfer function $G(\omega)$ given by $$G(\omega) = \sum_{n=1}^{N} (\alpha_n + j\beta_n) e^{jn\omega\tau} \qquad (6)$$

and subsequently detected by homodynes as previously described. Since it is well known that any realizable transfer function can be approximated over a finite frequency band (e.g., $\Delta f$) by the function $G(\omega)$, it follows that the circuits 24 and 24' function as equalizers.

Similarly, the transversal equalizer 24' generates at the output of summing network 30' the out-of-phase component $E_q(\omega)$ provided that, once again, the time delay separations $\tau$ are such that $\tau \leq 1/\Delta f$, but the distorted in-phase component from homodyne 14 is tapped and its signal portions attenuated by amounts of $+\beta_n$ whereas the out-of-phase component from homodyne 16 is tapped and attenuated by amounts $+\alpha_n$, i.e., the roles of $\alpha_n$ and $\beta_n$ are reversed and the sign of $\beta_n$ is changed from negative to positive, thus giving for $E_q(\omega)$ the following:

$$E_q(\omega) = \sum_{n=1}^{N} \beta_n D_i(\omega) e^{jn\omega\tau} + \sum_{n=1}^{N} \alpha_n D_q(\omega) e^{jn\omega\tau} \qquad (7)$$

Each of these equalized components can, if desired and if necessary, be reshaped by well-known regenerators 32 and 32' and then recombined by comparator 34 to produce at output 10 the original signal but equalized and at baseband. In the binary DPM case the comparator 34, by means well known in the art, compares the sign of the differential phase shift in one time slot in channel 33 with sign of the phase shift in the previous time slot in channel 33'. If the signs are the same, comparator output is positive (i.e., $+\pi/2$); if different, the output is negative (i.e., $-\pi/2$). Similarly, it then compares the sign of the differential phase shift in one time slot of channel 33' with the sign in the previous time slot in channel 33, generating a positive output when the signs are the same and a negative output when different. The output of the second comparison follows in time the output of the first comparison, and the comparisons are repeated until all the differential phase information is recovered. Since in a binary system the magnitude of the phase shift is always $\pi/2$, there is no need for the comparator to detect that magnitude. In higher order systems, however, where the magnitude of the phase shift can be integral multiples of $\pi/n$, the comparator would detect the magnitude as well as the sign of the differential phase shift.

It is common for the regenerators 32 and 32' to contain samplers which sample the signal generally at periodic instants in time, As mentioned previously it is possible to determine $\alpha_n$ and $\beta_n$ on a time domain basis. That is, $\alpha_n$ and $\beta_n$ are chosen such that the difference between the inverse Fourier transform of the equalizer and the signal $S(t)$ is equal to zero at a sufficient number of sampling instants, i.e., $$g(t_n) - S(t_n = 0 \qquad (8)$$

where the signal $S(t)$ is given by equation (1) and $$g(t) = F^{11}[G(\omega)]$$

where $G(\omega)$ is given by equation (6). Given the criterion of equation (8), the method of calculating $\alpha_n$ and $\beta_n$ is well known in the art and will not be repeated here in the interests of simplicity.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, if the above-described apparatus is incorporated into a repeater station as part of a lengthy transmission path, it is readily possible to upconvert the equalized baseband signal to carrier frequencies for further transmission.

What is claimed is:

1. A method for detecting and equalizing a carrier information signal having arbitrary modulation and distortion comprising the steps of:

removing the carrier from said distorted signal by a linear process, decomposing said distorted signal into distorted conjugate in-phase and out-of-phase components, directing each of said distorted conjugate components into separate first and second pluralities of separate transmission paths, adjusting the difference in time delay between adjacent ones of said paths within each of said pluralities to be not greater than the reciprocal of the bandwidth over which equalization is desired, attenuating that portion of said in-phase distorted component in the $n$th of its first plurality of paths by an amount $+\alpha_n$ and in the $n$th of its second plurality of paths by an amount $+\beta_n$, attenuating that portion of said out-of-phase distorted component in the $n$th of its first plurality of paths by an amount $-\beta_n$ and in the $n$th of its second plurality of paths by an amount $+\alpha_n$, summing said attenuated in-phase components of its first plurality of paths with said attenuated out-of-phase components of its first plurality of paths to produce an equalized baseband in-phase component of said information signal, and summing said attenuated in-phase components of its second plurality of paths with said attenuated out-of-phase components of its second plurality of paths to produce an equalized baseband out-of-phase component of said information signal.

2. The method of claim 1 including the additional step of combining said equalized in-phase and out-of-phase components to reproduce at baseband said information signal.

3. The method of claim 2 for use in a binary differentially coherent phase shift-keyed system wherein said information signal is characterized by a plurality of time slots and said combining step comprises first comparing the sign of the differential phase shift in one time slot of one of said components with the sign of the differential phase shift in the previous time slot of the other of said components and generating a positive output when both of the compared signs are alike and a negative output when different, and secondly, comparing the sign of the differential phase shift in one time slot of the other of said components with the sign in the previous time slot of said one component and generating a positive output when said compared signs are equal and a negative output when different, the output of said second comparison following in time the output of said first comparison, said comparisons being repeated until all of the differential phase information is recovered.

4. The method of claim 1 wherein said decomposing and carrier removing steps comprise the steps of:

dividing said information signal into two separate signals in phase quadrature with each other, generating a local oscillator signal phase locked to the carrier of said information signal, dividing said local oscillator signal into two separate signals in phase quadrature with each other, phase shifting by 90° one of said separate local oscillator signals, simultaneously applying one of said separate information signals and said phase shifted local oscillator signal to a first homodyne to generate the in-phase component of said information signal at baseband, and simultaneously applying the other of said separate information signals and said other separate local oscillator signal to a second homodyne to generate the out-of-phase component of said information signal at baseband.

5. The method of claim 1 including the step of setting $\alpha_n$ and $\beta_n$ to levels equal to the coefficients of the Fourier series of the Fourier transform of the system component producing said distortion.

6. The method of claim 1 wherein each of said first and second pluralities of separate transmission paths comprises a transversal equalizer including time delay, attenuating and summing means, and including the steps of sampling said equalized in-phase and out-of-phase components and setting $\alpha_n$ and $\beta_n$ to values such that the difference between the inverse Fourier transform of said equalizer and said undistorted signal is equal to zero at a sufficient number of sampling instants to allow satisfactory transmission.

7. Apparatus for the detection and equalization of carrier information signals having arbitrary distortion and modulation comprising, means for removing the carrier from the distorted information signal by a linear mixing process, means for decomposing said distorted signal into distorted conjugate in-phase and out-of-phase components, means for directing each of said distorted conjugate components into a first and second plurality of separate transmission paths, means for adjusting the difference in time delay between adjacent ones of said paths within each of said pluralities to be not greater than the reciprocal of the bandwidth over which equalization is desired, means attenuating the portion of said in-phase distorted component in the $n$th of its first plurality of paths by an amount $+\alpha_n$ and in the $n$th of its second plurality of paths by an amount $+\beta_n$, means for attenuating the portion of said out-of-phase distorted component in the $n$th of its first plurality of paths by an amount $-\beta_n$ and in the $n$th of its second plurality of paths by an amount $+\alpha_n$, means for summing said attenuated in-phase components of its first plurality of paths with said attenuated out-of-phase components of its first plurality of paths to produce an equalized baseband in-phase component of said information signal, and means for summing said attenuated in-phase components of its second plurality of paths with said attenuated out-of-phase components of its second plurality of paths to produce an equalized baseband out-of-phase component of said information signal.

8. The apparatus of claim 7 in combination with means for combining said equalized in-phase and out-of-phase components to reproduce at baseband said information signal.

9. The apparatus of claim 8 for use in a binary differentially coherent phase shift-keyed system wherein said information signal is characterized by a plurality of time slots and said combining means comprises a comparator which first compares the sign of the differential phase shift in one time slot of one of said components with the sign of the differential phase shift in the previous time slot of the other of said components and generates a positive output when said compared signs are alike and a negative output when said signs are different, and secondly, compares the sign of the differential phase shift in one time slot in said other component with the sign in the previous time slot in said one component and generates a positive output when said compared signs are the same and a negative output when different, the output of said second comparison following in time the output of said first comparison, said comparisons being repeated until all of the differential phase information is recovered.

10. The apparatus of claim 7 wherein said means for decomposing said signal and removing said carrier comprises, hybrid coupler means for dividing said information signal into two separate signals in phase quadrature with each other, means for generating a local oscillator signal, means for phase-locking said local oscillator signal to the carrier of said information signal, hybrid coupler means for dividing said phase-locked local oscillator signal into two separate signals in phase quadrature with each other, means for phase shifting by 90° one of said separate local oscillator signals, a first and a second homodyne, means for simultaneously applying one of said separate information signals and said phase shifted local oscillator signal to said first homodyne to generate the in-phase component of said information signal at baseband, and means for simultaneously applying the other of said separate information signals and said other separate local oscillator signal to said second homodyne to generate the out-of-phase component of said information signal at baseband.

11. The apparatus of claim 7 wherein said means for directing each of said distorted conjugate signal components into a first and second plurality of separate transmission paths comprises first and second transversal equalizers.

12. The apparatus of claim 11 wherein each of said transversal equalizers comprise: a plurally tapped delay line, a separate transmission path connected to each of the taps of each of said delay lines, each of said attenuating means being a part of a separate one of said transmission paths, the location of said taps being chosen such that the difference in time delay between adjacent paths is not greater than the reciprocal of the bandwidth over which equalization is desired.

13. The apparatus of claim 11 in combination with means for sampling said equalized baseband in-phase and out-of-phase components and wherein $\alpha_n$ and $\beta_n$ are set to levels such that the difference between the inverse Fourier transform of each of said equalizers and said undistorted information signal is equal to zero at a sufficient number of sampling instants.

14. The apparatus of claim 7 wherein $\alpha_n$ and $\beta_n$ are set to levels equal to the coefficients of the Fourier series of the Fourier transform of the system component producing said distortion.